(No Model.)

H. E. FAIRMAN.
POST DRIVER.

No. 276,677. Patented May 1, 1883.

Witnesses,
Geo. H. Strong
J. H. Rouse

Inventor,
H. E. Fairman
By Dewey & Co
Attorneys

UNITED STATES PATENT OFFICE.

HARRY E. FAIRMAN, OF SAN FRANCISCO, CALIFORNIA.

POST-DRIVER.

SPECIFICATION forming part of Letters Patent No. 276,677, dated May 1, 1883.

Application filed September 18, 1882. (No model.)

*To all whom it may concern:*

Be it known that I, HARRY E. FAIRMAN, of the city and county of San Francisco, State of California, have invented an Improved Post-Driver; and I hereby declare the following to be a full, clear, and exact description thereof.

My invention relates to certain new and useful improvements in post-drivers.

My invention consists in planting the ends of the weight guides or leads firmly on the ground by rocking the axle with which the machine is connected, in a means for adjusting the perpendicularity of the weight-guides, in a novel device for holding the posts steady, and in a novel raising and tripping mechanism for operating the weight. These, together with minor details of construction, will hereinafter fully appear.

The object of my invention is to furnish a machine for driving posts for fences, &c., which may be readily taken from place to place and be firmly stationed to complete the work of driving the posts.

Figure 2:
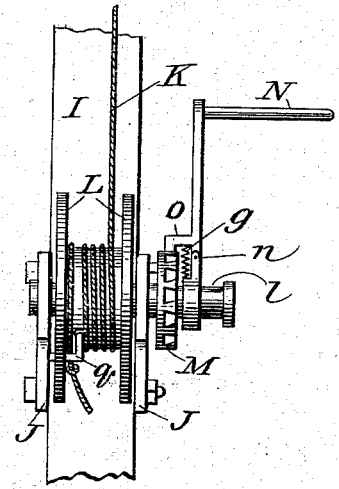
Figure 3:
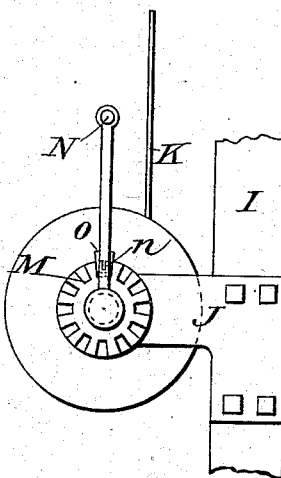
Figure 1:
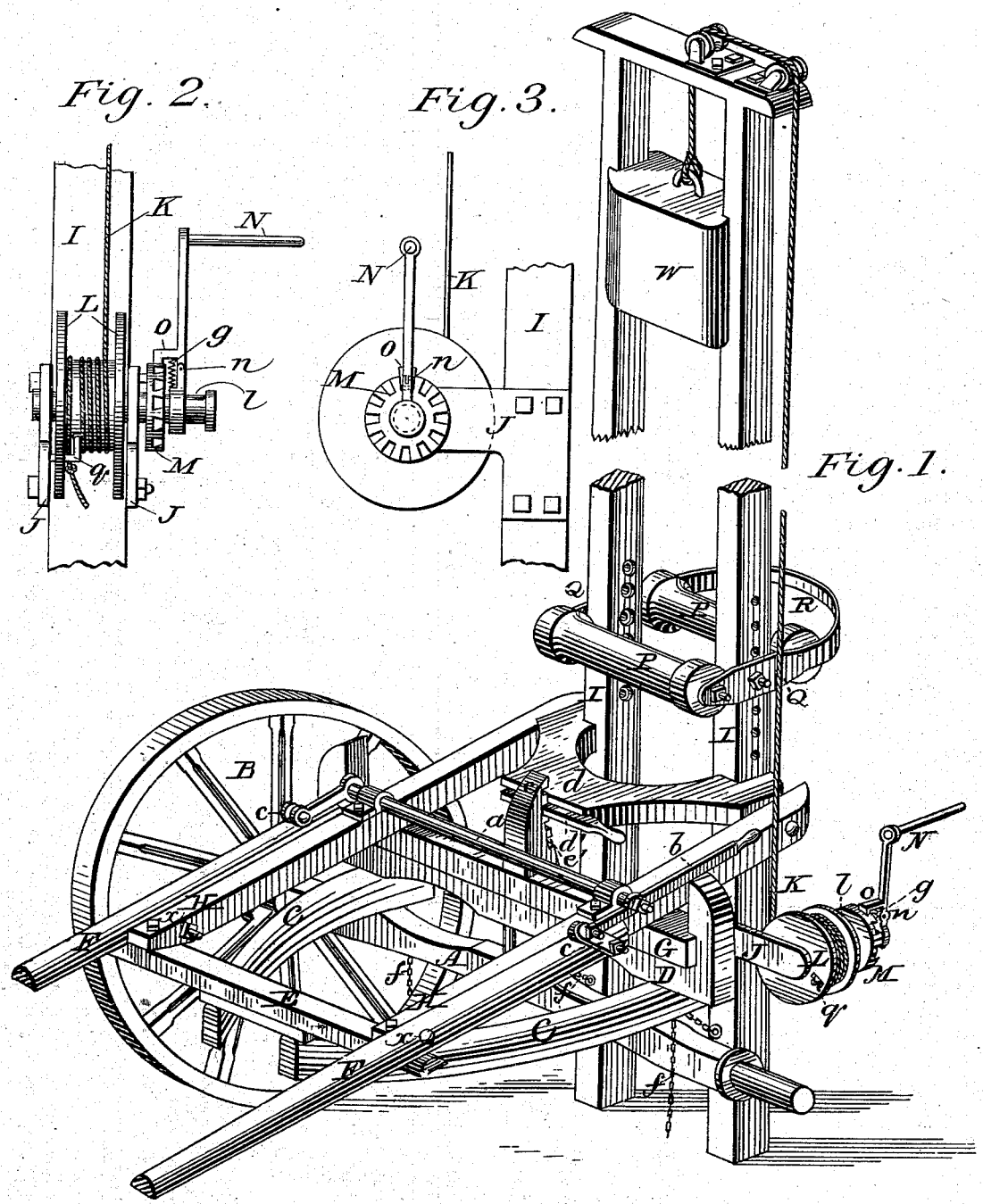

Referring to the accompanying drawings, Figure 1 is a perspective view of my device. Fig. 2 is an enlarged side elevation of the winding-drum. Fig. 3 is an enlarged front elevation of the same.

Let A represent the rear axle; B, the wheels; C, the hounds, and D the bolster of a wagon, from which the forward wheels and reach have been removed for the purpose of using the rear portion to support the post-driver. Upon the forward part of the hounds is supported a cross-bar, E, upon the ends of which the shafts F rest. The shafts extend back to a block, G, on top of the bolster, but are not connected therewith.

To the cross-bar E are rigidly secured, inside of the shafts, the arms H, to which are pivoted the shafts at *x*. They extend back over the block G and beyond, and have pivoted between their rear ends the upright guides or leads I, which extend down to the ground.

In the guides is the weight W, which, as will hereinafter be explained, is to be raised and dropped upon the head of the post.

The horse being driven to the spot and the machine backed in position for the post to be placed in position between the guides under the weight, the first object is to plant the guides firmly on the ground. Their perpendicularity can be insured because of their pivots in the arms H; but they must be brought down firmly against the ground to keep them perfectly steady. This is accomplished by rocking the axle A, as follows: Across the arms H is mounted a shaft, *a*, upon the projecting end of which is secured a lever, *b*. The end of the lever extends beyond the shaft, and has pivoted to it at an angle a short bar, *c*, the outer end of which is attached to the side of the shaft, forming thus a knee-lever. The other end of the shaft has no handle-lever, but has the knee-lever, as described, which is operated by the movement of the shaft *a*, directed from the lever *b*. It is obvious that by reason of the shafts being held stationary the movement of the lever *b* will cause the axle A, through the arms H, bolster D, and block G, to rock, and thus either plant the guides firmly against the ground or remove them, according to the direction of rotation. By these means I will not have to resort to the various devices now employed to steady machines of this character—such as staking the wheels and bracing the guides—but the machine will remain firm and steady. As before mentioned, the guides, being pivoted, may be adjusted to the perpendicular, no matter what may be the level of the ground. To secure them when adjusted I have the following device: Upon the inner side of the guides is a bracket, *d*, in the face of which is a sliding tongue, *d'*, as shown.

Upon the block G is an upright rack, *e*, having a curved face and a series of grooves, *e'*, into any one of which the tongue *d'* may be fitted to hold the guides. Chains *f*, attached to the hounds and to the lower part of the guides, insure the safety of the guides. They may be unhooked when it is desired to swing the guides to a horizontal position for transportation.

Mounted in arms J, upon one of the guides I, is the winding-drum L, adapted to receive a rope, K, extending up over guide-pulleys in the top of the guides and down to the weight W.

Fast upon the shaft *l*, which carries the drum L, is the clutch-pulley M. The teeth of this pulley extend around its face, and are made with inwardly-beveled edges or sides, as shown in Fig. 2.

N represents the crank-handle, loosely mounted upon the shaft $l$, and hinged at $n$ in such a manner that its upper portion may swing sidewise, either to or from the clutch-pulley M, but will preserve its rigidity in the line of its revolution. Upon the inner side of the upper or swinging end of the crank is the clutch-pawl $o$. This has a bent point, as in Fig. 2, and is adapted, by reason of its position on the crank and the hinges of said crank, to swing down from a point a little above into engagement with the teeth of the clutch-pulley. When the crank is moved over to engage its clutch-pawl the latter at once finds its way into the beveled sides of the teeth and there remains secure, insuring the revolution of the drum. When I wish to throw it out of engagement I swing the crank back, and, as explained, because of the arc through which the clutch-pawl moves, it has no tendency to come out straight, as it could not do, being in the bevel of the sides, but rises out of engagement in a curve, which carries it clear of the teeth. A small spring, $g$, secured to the lower part of the crank and to the pawl $o$, is compressed when the lever is thrown over into engagement, and serves, when said lever is thrown out, to hold the swinging end back to insure its non-interference by accident with the rapidly-revolving pulley. From this construction it will be seen how I propose to trip the weight. After throwing the crank into engagement and winding up the rope on the drum to lift the weight a sudden movement of the hand will throw the pawl out and release the drum, allowing the weight to descend upon the post. If by some accident the weight should descend farther than was intended, it would do damage to the winding mechanism, as it would drag on the rope which is secured to the winding-drum. To provide for this I have a safety-staple, $q$, Figs. 2 and 1. It consists of an angled piece, one arm of which is secured through a slot in the rim of the drum, and the other arm is loosely fitted in a socket in the face of the drum. The rope is passed through this staple and knotted. When winding it pulls against the staple; but in unwinding, if its limit is reached, it pulls the staple out of the face of the drum, and thus releases itself, preventing injury.

Upon the guides I, on each side, are rollers P, connected by bars Q, secured and pivoted by pins or bolts to the sides of the guides.

R is a curved handle connected with the side bars. This device is for the purpose of holding the post steady in the guides. Being pivoted, as shown, it may, by depressing or raising the handle R, be made to bind upon or fit any size post, by reason of each roller approaching or receding from a central perpendicular line. In the sides of the guides a number of holes are made to provide for the vertical adjustment of the rollers.

I am aware that a post or pile driver mounted on wheels and having pivoted standards serving as ways for the weighted hammer, and means by which standards can be adjusted and retained in a perpendicular position when the supporting-wheels are on uneven ground, is old, and such I do not wish to be understood as claiming broadly as of my invention.

Having thus described my invention, I desire to secure by Letters Patent—

1. In a post-driver, the axle A, wheels B, and hounds C, in combination with the cross-bar E, the arms H, pivoted weight guides or leads I, extending to the ground, shafts F, pivoted to the arms, and a means connected with the shafts and arms to rock the axle and plant the guides I firmly on the ground, all arranged substantially as and for the purpose herein described.

2. In a post-driver, the axle A, wheels B, and hounds C, in combination with the cross-bar E, arms H, secured thereto, pivoted weight guides or leads I, extending to the ground, shafts F, pivoted to the arms H, and the means for rocking the axle, for the purpose described, consisting of the shaft $a$ on the arms H, handle-lever $b$, and knee-lever formed with the bar $c$, connected with the shafts, as shown, all arranged and operating substantially as herein described.

3. In a post-driver, the axle A and wheels B, in combination with the shafts F, arms H, and the upright weight guides or leads I, pivoted in said arms, and a means for adjusting said guides perpendicularly, all arranged substantially as herein described.

4. In a post-driver, the axle A and wheels B, in combination with the shafts F, arms H, upright weight guides or leads I, pivoted in said arms, the bracket $d$ on the guides, having a sliding tongue, $d'$, and the rack $e$, with its grooves $e'$, all arranged and operating substantially as herein described.

5. In a post-driver, the combination of the axle A, wheels B, and hounds C, the cross-bar E on the hounds, arms H on the cross-bar, shafts F, pivoted to the arms, upright weight guides or leads I, a means for adjusting the guides perpendicularly, and a means for rocking the axle to plant said guides firmly on the ground, all substantially as herein described.

6. In a post-driver, the upright leads or guides I and sliding weight W therein, in combination with the means for raising the weight, and tripping mechanism for dropping it, consisting of the rope K and winding-drum L on shaft $l$, the clutch-pulley M, having teeth with inwardly-beveled sides, and the laterally-swinging hinged crank N, loose upon shaft $l$, and having a bent clutch-pawl, $o$, adapted to swing down to and engage with the teeth of the clutch-pulley M, and to be thrown out of engagement therewith by swinging said crank, all arranged and operating substantially as herein described.

7. The clutch mechanism herein described, consisting of the clutch-pulley M, having teeth with inwardly-beveled sides, and the crank N, loosely mounted on the same shaft with the clutch-pulley, said crank being hinged to swing to or from the clutch-pulley, but rigid on the line of its revolution, and having the bent clutch-pawl o on its swinging portion, adapted to engage with the beveled sides of the teeth of the pulley when the crank is moved toward it, and to move out of engagement therewith when the crank is moved away, substantially as herein described.

8. The winding-drum L and rope K, in combination with the safety-staple q, consisting of an angled piece, one arm of which is secured in a slot in the rim of the drum, and the other is loosely fitted in a socket in the face of the drum, operating substantially as herein described.

9. In a post-driver, the upright guides or leads I, in combination with the device for securing the post in said guides, consisting of the oppositely-placed rollers P, connected by side arms, Q, pivoted at their centers to the guides, substantially as herein described.

In witness whereof I hereunto set my hand.

HARRY E. FAIRMAN.

Witnesses:
L. H. NOURSE,
G. W. EMERSON.